May 6, 1924.
H. H. TIMIAN
1,493,295
VARIABLE HOT SPOT FUEL PASSAGE
Filed April 30, 1921
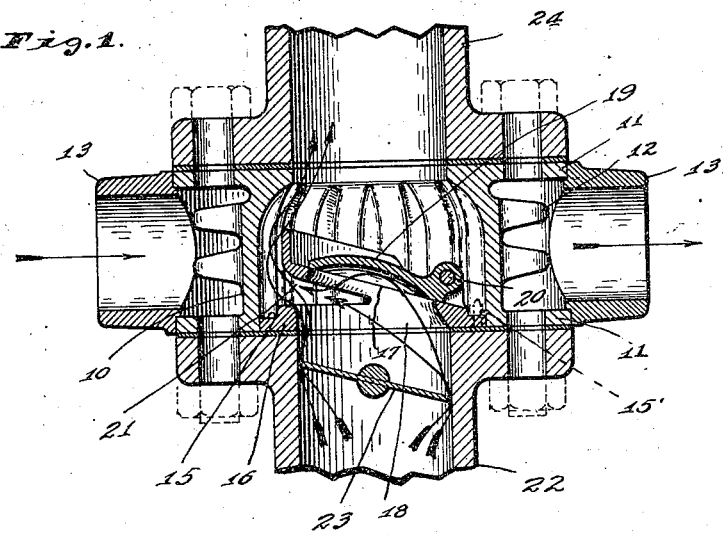
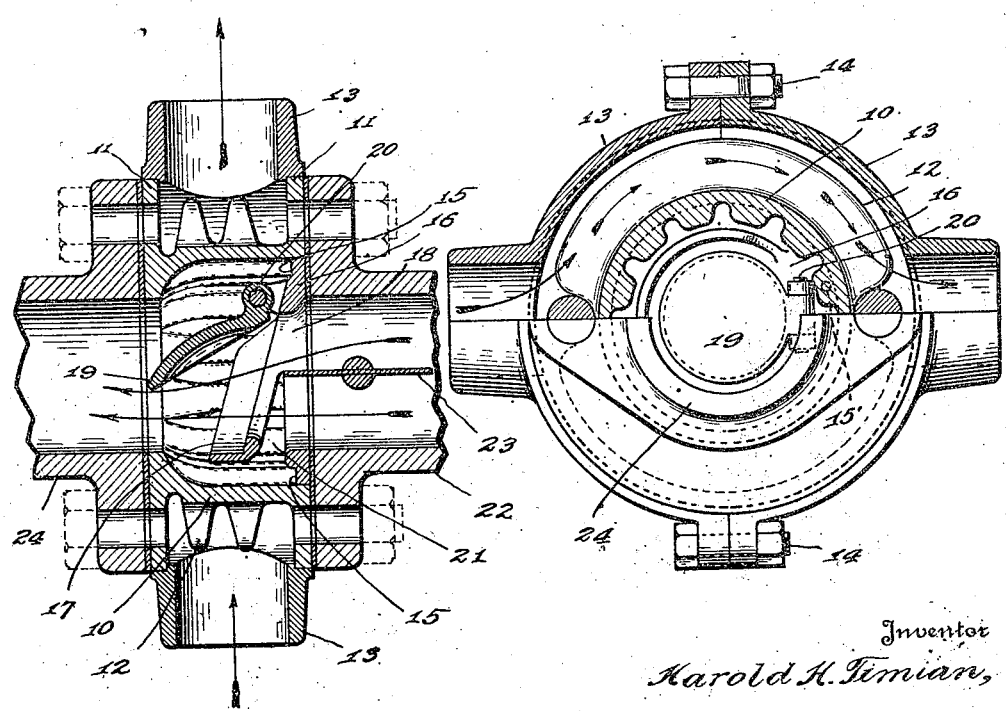
Inventor
Harold H. Timian,
By Hood Sickley
Attorneys Patented May 6, 1924.

1,493,295

UNITED STATES PATENT OFFICE.

HAROLD HUBBARD TIMIAN, OF KOKOMO, INDIANA.

VARIABLE HOT-SPOT FUEL PASSAGE.

Application filed April 30, 1921. Serial No. 465,731.

*To all whom it may concern:*

Be it known that I, HAROLD H. TIMIAN, a citizen of the United States, residing at Kokomo, in the county of Howard and State of Indiana, have invented a new and useful Variable Hot-Spot Fuel Passage, of which the following is a specification.

The object of my invention is to produce a structure which may be associated with the fuel supply passage of an internal combustion engine to automatically cause the fuel mixture to be variably affected by a heating element in inverse relation to the fuel demand, that is to say, when the engine is running with throttle adjacent its closed position the fuel mixture will be subjected to a greater relative heating than when the engine is running with the throttle adjacent its open position.

The accompanying drawings illustrate my invention. Fig. 1 is a vertical axial section of my improved device with adjacent portions of the fuel passage indicated in full lines and the structure arranged for use in a vertical passage; Fig. 2 is a similar section with the parts arranged for use in conjunction with a horizontal fuel passage; Fig. 3 is an elevation of the exit end of the structure.

In the drawings, 10 indicates the main tubular body provided at each end with radial parallel flanges 11, and intermediate external heat absorbing ribs 12. The circumferential edges of flanges 11 are machined so as to receive a pair of mating coupling members 13, 13 which may be clamped upon flanges 11 by bolts 14 so as to form connections with pipes forming part of the exhaust system of the engine. The interior of main body 10, is longitudinally ribbed, as indicated at 15, and at one end is adapted to receive a valve ring 16 having an inclined valve seat 17 surrounding a main passage 18 normally closed by a gravity valve 19 pivoted at 20 upon ring 16. At one side, adjacent the free end of valve 19, the ring 16 is perforated to form a by-pass 21 arranged to direct material passing therethrough to and upon the adjacent portion of the wall of the body 10.

The receiving end of body 10 is adapted to be attached to a supply pipe 22 in which the usual throttle valve 23 is mounted, and the delivery side of body 10 is adapted to be attached to the fuel passage 24.

The ring 16 being separate from body 10, it is apparent that, by reason of a pin 15', this ring 16 may be set into any desired angular relationship to body 10. The rotatable connection between body 10 and the pipe connections 13, 13 also permits intensive local heating of any desired segment of wall 10. Consequently, by a proper angular adjustment of ring 16 and coupling 13, 13, the opening 21 may be so positioned as to direct material flowing therefrom to any desired portion of the wall of body 10 so as to thus obtain any desired heating effect.

Whether the ring 16 be arranged for horizontal or vertical flow of the fuel mixture, the valve 19 is normally closed by gravity. When the throttle 23 is wide open, the flow of fuel through the structure will be at sufficient velocity, and the mass of the mixture with sufficient inertia to raise valve 19 from its seat so that the main body of the mixture flow will be through opening 18 and thus avoid, to a considerable extent, the heated wall of main body 10, the velocity of the mixture stream being such as to successfully carry the liquid or vaporized content of the mixture to the cylinders. When the throttle is at or near its closed position, however, the velocity of the mixture which passes the throttle, and the mass of this mixture, is too small to lift the valve 19 from its seat and consequently the mixture will be diverted through passage 21 and thus caused to strike the heated wall of body 10 and thus become heated so that the decreased velocity will not result in precipitation of the fuel content. It will, of course, be understood that, at intermediate positions of the throttle, the valve 19 will occupy intermediate positions so that more or less of the fuel mixture will pass through opening 19 or by-pass 21, the valve 19 riding upon the fuel mixture stream at a greater or lesser distance from its seat 17.

I claim as my invention:

1. As an article of manufacture, a fuel passage element for internal combustion engines comprising a tubular body adapted to be heated, a valve ring associated with said main body, by means permitting relative angular adjustment, said valve ring comprising a central passage and a lateral by-pass, and a valve normally seating over said main passage and movable therefrom by stream flow.

2. As an article of manufacture, a fuel passage element for internal combustion engines comprising a tubular body adapted to be heated, a valve ring associated with said main body, said valve ring comprising a central passage and a lateral by-pass, and a valve normally seating over said main passage and movable therefrom by stream flow.

In witness whereof, I have hereunto set my hand at Kokomo, Indiana, this 25th day of April, A. D., one thousand nine hundred and twenty-one.

HAROLD HUBBARD TIMIAN.

Witnesses:
NORA E. RUSSELL,
JULIA T. TIMIAN.